United States Patent [19]

Southern et al.

[11] Patent Number: 4,643,267

[45] Date of Patent: Feb. 17, 1987

[54] FISH WEIGHT AND LENGTH COMPARISON APPARATUS

[76] Inventors: Thomas W. Southern, Rt. 1, Box 99B, Lineville, Ala. 36266; Phillip G. Daniel, 1108 Whippoorwill La., Roanoke, Ala. 36274

[21] Appl. No.: 800,736

[22] Filed: Nov. 22, 1985

[51] Int. Cl.$^4$ .................. G01G 19/00; G01G 1/18
[52] U.S. Cl. .................. 177/190; 177/200; 177/245; 177/246
[58] Field of Search ............ 177/190, 245, 246, 200

[56] References Cited

U.S. PATENT DOCUMENTS

| | | |
|---|---|---|
| 1,354,275 | 9/1920 | Bachman .................. 177/200 X |
| 2,750,184 | 6/1956 | Warndahl .................. 177/245 X |
| 2,805,850 | 9/1957 | Robinson .................. 177/245 X |
| 3,077,237 | 2/1963 | Nakayama .................. 177/245 X |
| 3,786,885 | 1/1974 | Mills .................. 177/245 |
| 4,106,220 | 8/1978 | Hurd .................. 177/190 X |

Primary Examiner—George H. Miller, Jr.
Attorney, Agent, or Firm—Michael C. Smith

[57] ABSTRACT

Apparatus for quickly comparing the weights of fish and quickly determining whether fish have sufficient length, comprising an elongated balance beam having fish stop means, fish attachment means and fish length indication means at each end of the beam, a handle rotatably secured to the beam at its longitudinal center of gravity and a bubble level indicator secured to the face of the beam.

8 Claims, 3 Drawing Figures

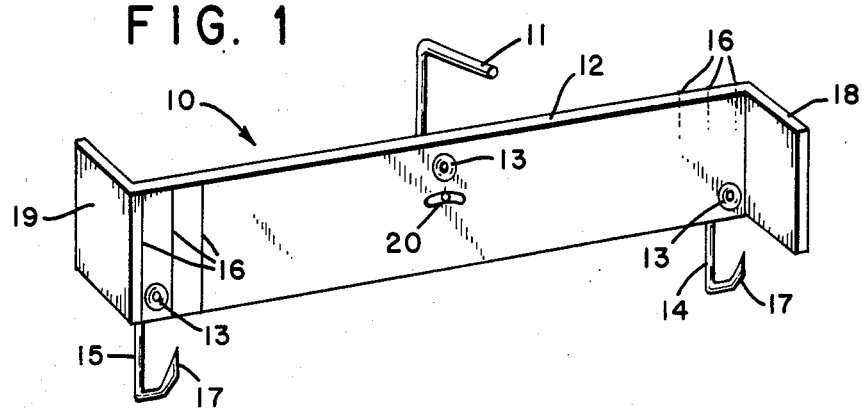
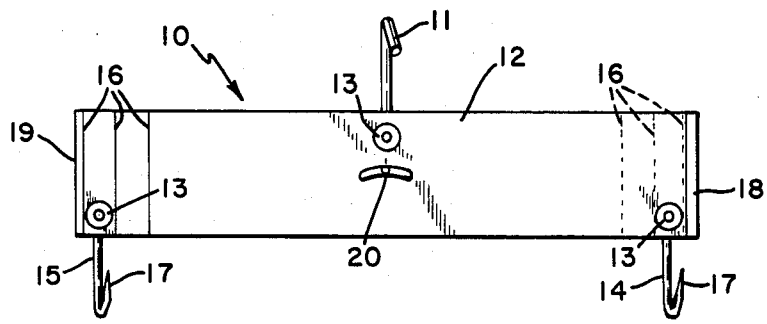
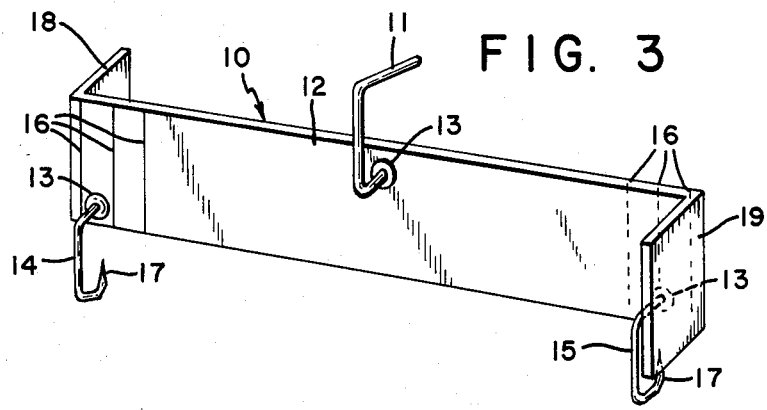

FISH WEIGHT AND LENGTH COMPARISON APPARATUS

TECHNICAL FIELD

The present invention relates generally to apparatus for quickly culling out fish which are of insufficient length and quickly determining which of two particular fish has greater weight, and specifically to a fish length and weight comparison apparatus comprising balance means and length measurement means.

BACKGROUND ART

It is well known in the fishing arts, especially where tournament fishing is involved, that there is a need to quickly determine whether a particular fish meets size limits required by game and fish authorities and to quickly determine which of a number of fish have the greatest weight. For example, where a bass tournament is conducted in which "keeper" bass must be at least sixteen inches long and the tournament rules require a total catch limit of ten bass, there is a need to quickly determine whether or not a particular bass meets the length requirement for the tournament and which are the ten bass having the greatest weight of all the bass caught.

The typical prior art fish weighing apparatus is a scale upon which the weights of the several fish can be determined and recorded for comparison with other fish. This process is time consuming because the fisherman is required to determine the actual weight of the various fish for comparison purposes. A more appropriate apparatus would be based on a balance beam which would allow the fisherman to eliminate the step of comparing actual weights by allowing the balance apparatus to indicate the heavier fish.

Balance beams are also well known in the art, as can be seen by reference to U.S. Pat. Nos. 215,477; 591,202; 3,404,743; and 3,354,971. U.S. Pat. No. 215,477 is for a weigher for an assayer which includes a beam with hook members at either end for determining the weight of gold and silver. U.S. Pat. No. 591,202 is for a scale-beam combination. U.S. Pat. No. 3,404,743 is for a rather complex balance device which includes elaborate detailed parts for precise measurement in an automatic balancing system. U.S. Pat. No. 3,353,971 is for an equal arm balance with an improved sheet metal beam. The prior art apparatus for determining the length of the fish is simply a conventional ruler.

Neither the ruler nor the prior art balance apparatus is sufficiently efficient for tournament fishing because the conventional balance beam is awkward and because multiple steps and multiple devices are required.

DISCLOSURE OF INVENTION

The present invention eliminates the difficulties involved with prior art weighing devices and length measuring devices by providing one apparatus for quickly comparing the weights of fish and quickly determining whether fish have sufficient length. The present invention is a fish weight and length comparison apparatus comprising a handle, rotatably attached to an elongated beam, which has attachment means connected to each end thereof and means for determining whether fish exceed certain minimum length requirements.

Thus, a major object of the present invention is to provide an apparatus to efficiently determine whether certain fish are of sufficient length and to efficiently determine which of several fish have greater weight.

BRIEF DESCRIPTION OF THE DRAWINGS

While the specification concludes with claims particularly pointing out and distinctly claiming the subject matter which is regarded as the invention, it is believed that the invention, objects, features and advantages thereof will be better understood from the following description taken in connection with the accompanied drawings in which like parts are given like identification numerals and wherein:

FIG. 1 is a perspective front view of the present invention in balancing mode;

FIG. 2 is a front view of the present invention in the horizontal position; and

FIg. 3 is a rear perspective of the invention.

BEST MODE FOR CARRYING OUT THE INVENTION

As FIG. 1 illustrates, the perferred embodiment of the present fish weight and length comparison apparatus is indicated generally at 10. This apparatus comprises a J-shaped handle 11 rotatably secured substantially perpendicular to an elongated beam 12 by bearing 13, with securement means 14, 15 rotatably secured to each end of said beam by bearing means 13, and with multiple measurement means 16 inscribed in said beam 12. The present fish comparison device 10 works on the principle of balance, so that when two fish of equal weight are secured to each attachment means 14, 15, beam 12 will be in a state of balance. However, when one fish is heavier, a state of imbalance occurs, indicating the heavier fish. The most appropriate use of the present fish comparision apparatus 10 is in competitive fishing such as a bass tournament wherein the fisherman or fishing team having the heaviest catch is the winner. Such events normally limit the number of fish that can be accumulated by each competitor or team. Most fish usually can be visually separated into a size catagory of acceptable or unacceptable, however, where several fish are caught, several fish appear identical in size and weight. Since the winner of such an event can be determined by a difference of a fraction of an ounce, only the heavier fish having sufficient length should be retained. In order to determine which of two apparently identical fish has greater weight, the fisherman attaches each of the apparently identical fish to opposite attachment means 14, 15 of beam 12. The fish attachment procedure also involves measurement of the length of the fish. Each fish that is caught is placed on the horizontally oriented beam 12, with the fish's closed mouth pressed against one of the two opposite facing right angle stop means 18 or 19 of FIG. 2. First stop means 18 extends from a first end of beam 12 in a direction which is 90 angular degrees from the longitudinal axis of beam 12, and a second stop means 19 extends from a second end of beam 12 in a direction which is 90 angular degrees from the longitudinal axis of beam 12 and is opposite to the direction of extension of first stop means 18. The tail of the fish will extend toward measurement means 16 indicating the acceptable length of the fish. If the fish is of acceptable length, then it is placed into the livewell of the boat. Once a limit of fish is caught, the next fish caught must be compared with the existing limit of fish in order to determine if it is heavier than any of the other fish. This culling procedure is accomplished by hooking a fish on attachment means 14 with hook 17 penetrating the thin membrane underneath the fish's jaw. The second fish is attached to the opposite means 15 at hook 17 by its lower jaw. Hooks 17 preferably open toward the front of the apparatus 10. Then, by holding handle 11, the fisherman allows beam 12, which has equal weight on each lateral side of the bearing 13 without fish attached thereto, to seek a balanced alignment determined by the relative weight of the fish. If the fish on the right side has greater weight the right side will lower and the left side will rise, and if the left fish is heavier than the right, the left side will lower and the right side will rise. If the fish are so close in weight that the fisherman cannot tell whether beam 12 is inclined more to one side or the other, a bubble level 20 is incorporated on the front of beam 12 to indicate whether beam 12 is horizontal or not. While most apparently identical fish will have sufficient weight difference to cause visually detectable imbalance of the present apparatus 10, bubble level 20 can be relied on to make a comparison determination in very close cases. In this manner, the fisherman can determine, with this single apparatus, which of two substantially identical fish have the greater weight and whether the fish meet certain length requirements.

FIG. 3 is a rear view of the apparatus 10 showing an additional view of the parts which have been discussed in detail herein above.

While this invention has been described in detail with particular reference to a preferred embodiment thereof, it will be understood that variations and modifications can be effective within the spirit and scope of the invention as described herein before and as defined in the appended claims.

INDUSTRIAL APPLICABILITY

This invention is capable of exploitation in the sport fishing industry, and is particularly useful in a system for comparing lengths and weights of fish in a competitive tournament environment.

I claim:

1. Apparatus for comparing the lengths and weights of two apparently identical items, comprising:
   an elongated beam;
   a first attachment means rotatably secured to a first end of said beam;
   a second attachment means rotatably secured to a second end of said beam;
   a first stop means extending from a first end of said beam in a direction which is 90 angular degrees from the longitudinal axis of said beam;
   a second stop means extending from a second end of said beam in a direction which is 90 angular degrees from the longitudinal axis of said beam and is opposite to the direction of extension of said first stop means;
   a handle rotatably secured to said beam at the center of gravity of said beam; and
   length indication means inscribed in a surface of said beam, located between said first stop means and said second stop means.

2. The apparatus of claim 1 wherein each attachment means comprises a hook, aligned substantially perpendicular to said beam.

3. The apparatus of claim 2 wherein said handle is secured to said beam by bearing means.

4. The apparatus of claim 3 wherein each of said hooks is secured to said beam by bearing means.

5. The apparatus of claim 4 wherein said length measurement means comprise a series of marks at predetermined distances from said stop means.

6. The apparatus of claim 5 further comprising a bubble level on the surface of said beam, adapted to indicate horizontal balance of said beam.

7. The apparatus of claim 6 wherein said handle is aligned substantially perpendicular to said beam.

8. The apparatus of claim 7 wherein each hook opens in the same direction.

* * * * *